(12) United States Patent
van der Wateren et al.

(10) Patent No.: US 8,824,449 B2
(45) Date of Patent: Sep. 2, 2014

(54) SYNCHRONIZATION OF BROADCAST-ONLY WIRELESS NETWORKS

(75) Inventors: Frits van der Wateren, Haarlem (NL); Albert Martinus Bos, Nistelrode (NL); Siebren de Vries, Haarlem (NL)

(73) Assignee: Chess ET International BV, Haarlem (NL)

( * ) Notice: Subject to any disclaimer, the term of this patent is extended or adjusted under 35 U.S.C. 154(b) by 379 days.

(21) Appl. No.: 12/587,538

(22) Filed: Oct. 7, 2009

(65) Prior Publication Data
US 2010/0226359 A1 Sep. 9, 2010

Related U.S. Application Data

(60) Provisional application No. 61/209,447, filed on Mar. 5, 2009.

(51) Int. Cl.
*H04J 3/06* (2006.01)
(52) U.S. Cl.
USPC .......................................................... 370/350
(58) Field of Classification Search
USPC .......................................................... 370/350
See application file for complete search history.

(56) References Cited

U.S. PATENT DOCUMENTS

| | | | |
|---|---|---|---|
| 5,041,966 A | 8/1991 | Nakai et al. | |
| 5,644,576 A | 7/1997 | Bauchot et al. | |
| 5,987,024 A | 11/1999 | Duch et al. | |
| 6,125,368 A * | 9/2000 | Bridge et al. | 1/1 |
| 6,510,150 B1 | 1/2003 | Ngo | |
| 6,816,510 B1 | 11/2004 | Banerjee | |
| 6,831,932 B1 * | 12/2004 | Boyle et al. | 370/539 |
| 6,970,448 B1 | 11/2005 | Sparell et al. | |
| 7,043,651 B2 | 5/2006 | Aweya et al. | |
| 7,151,945 B2 | 12/2006 | Myles et al. | |
| 2003/0174690 A1 * | 9/2003 | Benveniste | 370/350 |
| 2005/0074025 A1 | 4/2005 | Shao et al. | |
| 2005/0080924 A1 | 4/2005 | Shang et al. | |

(Continued)

FOREIGN PATENT DOCUMENTS

EP 1936886 6/2008
WO WO 2009/156823 12/2009

OTHER PUBLICATIONS

Elson et al., "Wireless Sensor Networks: A New Regime for Time Synchronization", 2002, Proceedings 1st workshop on hot topics in networks.

(Continued)

*Primary Examiner* — Brandon Renner
*Assistant Examiner* — Faisal Choudhury
(74) *Attorney, Agent, or Firm* — Lumen Patent Firm (57) ABSTRACT

Time synchronization for nodes of a broadcast-only network is provided by combining two methods. The first method provides relative synchronization of communication frames of node broadcasts, so that all nodes have frames with aligned start and end times. The second method associates a network time with each frame at each node (i.e., each node locally tracks this network time). When a time-stamped message is received by a node, the node network time is set to the larger of its current value or the time stamp of the received message. Each node increments its network time by the same amount from one communication frame to the next.

4 Claims, 9 Drawing Sheets

(56) References Cited

U.S. PATENT DOCUMENTS

| | | | |
|---|---|---|---|
| 2005/0195772 A1* | 9/2005 | Nishikawa et al. | 370/337 |
| 2005/0201340 A1* | 9/2005 | Wang et al. | 370/337 |
| 2005/0237966 A1* | 10/2005 | Aiello et al. | 370/321 |
| 2005/0286440 A1 | 12/2005 | Strutt et al. | |
| 2006/0128349 A1 | 6/2006 | Yoon | |
| 2007/0025398 A1* | 2/2007 | Yonge et al. | 370/508 |
| 2007/0177574 A1* | 8/2007 | Park et al. | 370/350 |
| 2007/0184870 A1* | 8/2007 | Muqattash et al. | 455/522 |
| 2008/0232344 A1* | 9/2008 | Basu et al. | 370/350 |
| 2008/0273521 A1* | 11/2008 | Shao et al. | 370/350 |
| 2009/0088183 A1* | 4/2009 | Piersol et al. | 455/456.1 |
| 2009/0238153 A1* | 9/2009 | Sim | 370/336 |
| 2009/0316679 A1* | 12/2009 | Van Der Wateren | 370/347 |
| 2010/0278087 A1* | 11/2010 | Kawakami et al. | 370/311 |

OTHER PUBLICATIONS

Huang et al., "On the Scalability of IEEE 802.11 Ad Hoc Networks", 2002, MOBIHOC'02.

Rentel et al., "Network Synchronization in Wireless Ad Hoc Networks", 2004, Carleton University Technical Report SCE-04-08.

Romer et al., "Time Synchronization in Ad Hoc Networks", 2001, Proc. 2nd ACM Intl. Symp. on Mobile ad hoc networking and computing.

Rentel et al., "A mutual network synchronization method for wireless ad hoc and sensor networks", May 2008, pp. 633-646, IEEE Trans. Mobile Computing v7n5.

Zhou et al., "An accurate and scalable clock synchronization protocol for IEEE 802.11-based multihop ad hoc networks", Dec. 2007, pp. 1797-1808, IEEE Trans. Parallel and Distributed Systems v18n12.

* cited by examiner

SYNCHRONIZATION OF BROADCAST-ONLY WIRELESS NETWORKS

CROSS REFERENCE TO RELATED APPLICATIONS

This application claims the benefit of U.S. provisional patent application 61/209,447, filed on Mar. 5, 2009, entitled "Ad hoc wireless networks with a shared state", and hereby incorporated by reference in its entirety.

FIELD OF THE INVENTION

The invention relates to synchronization of nodes in communication networks.

BACKGROUND

Wireless networks, such as wireless sensor networks, serve a wide variety of applications, including monitoring, imaging, and tracking, for industrial and military applications. In wireless networks, it is often important for a network time to be defined, such that each node is able to assign network times to events in a manner that is consistent from node to node. One simple approach for providing a network time designates a node to act as a master node, to which the other nodes synchronize their respective local times (e.g., by receiving time stamped messages from the master node). However, this approach does not scale well to large networks, and it is difficult to apply it to certain cases of interest, such as ad hoc wireless networks. In an ad hoc network, nodes can join or leave the network depending on external events, so it is important to provide distributed synchronization. For example, if a master node were employed to provide synchronization in an ad hoc network, it would be highly disruptive if the master node were to leave the network.

To avoid this problem, various distributed synchronization methods have been proposed. In some approaches, local clocks at each node are synchronized. In other approaches, the local node clocks are not synchronized, but transformations of time stamps on received messages to local node time are performed. However, for either of these approaches, complications can be introduced by the need to properly account for message propagation delays between the nodes, especially since these delays can change as the physical configuration of the network changes. Another complicating factor in conventional synchronization approaches is the high precision and accuracy often required of time stamps (e.g., the IEEE 802.11 standard specifies a 64 bit timer having 1 μs resolution), which can place stringent demands on the performance of synchronization methods.

Accordingly, it would be an advance in the art to provide distributed synchronization for wireless networks that avoids these shortcomings.

SUMMARY

In the present approach, time synchronization for nodes of a broadcast-only network is provided by combining two methods. The first method provides relative synchronization of communication frames of node broadcasts, so that all nodes have frames with aligned start and end times. The second method associates a network time with each frame at each node (i.e., each node locally tracks this network time). When a time-stamped message is received by a node, the node network time is set to the larger of its current value or the time stamp of the received message. Each node increments its network time by the same amount from one communication frame to the next.

More specifically, each communication frame is partitioned into an active phase in which messages may be broadcast and received, and an idle period in which no transmission or reception occurs. Some or all of the broadcasted messages are frame-stamped messages that include information as to the active period start time of the broadcasting node. Active periods of the communication frames of the nodes can be synchronized by adjusting start times of the communication frames of the nodes receiving the frame-stamped messages.

Furthermore, each node maintains a network time which is incremented at each of the nodes by a predetermined amount during each idle period of the communication frames. Some or all of the broadcasted messages are time-stamped messages that include information as to the network time of the broadcasting node. When a time-stamped message is received by a node, the node network time is set to the larger of its current value or the time stamp of the received message. Broadcast messages can be both time-stamped and frame-stamped.

Preferably, the network time is a digital value, and is incremented by a single unit at each node during the idle periods. For example, if the repetition rate of the communication frames is 1 Hz, then each unit of network time corresponds to 1 second.

The active periods can include a time division multiple access (TDMA) schedule having two or more TDMA slots. In this situation, the active period start time information in the frame-stamped messages can include identification of which of the TDMA slots is used to broadcast the frame-stamped messages.

Adjusting the start times of the communication frames can entail determining a time offset between a local frame start time and a frame start time of a received frame-stamped message, and updating the local frame start time to reduce or eliminate this time offset.

The durations of active periods for each of the nodes can be independently, automatically and dynamically determined according to relevant local conditions.

The duration of the communication frames can be fixed in time (e.g., 1 second per frame) while the network is operational. Alternatively, the duration of the communication frames can vary in time (e.g., 1 second per frame some of the time, and 0.5 second per frame at other times) while the network is operational. In either case, all nodes of the network have the same communication frame duration.

The idle period of the communication frames can be longer than, equal to, or shorter than the active period. In situations where reducing power consumption is important, it is often preferred for the idle period to be longer than the active period.

DETAILED DESCRIPTION

Section A below provides an exemplary description of a broadcast-only wireless network, including methods for providing the above-described synchronization of communication frames. Section B below provides a description of network time synchronization for a broadcast-only wireless network. Network time synchronization as described above and in section B can be applied in connection with the system of section A, or in connection with other broadcast-only wireless networks. Thus, section A provides a specific example of a system in which the present network time synchronization approach can be implemented.

Section A: Broadcast-Only Networking

A communication system between a plurality of nodes in an ad-hoc network can be difficult to implement, particularly with mobile nodes, commonly found in ad-hoc wireless sensor networks. The present approach is directed to communication between nodes in a distributed network using a media access control (MAC) layer optimized for gossip protocols. The scalability of the communication system of the present approach is apparent by the communication system's decentralized and distributed nature.

Figure 1:
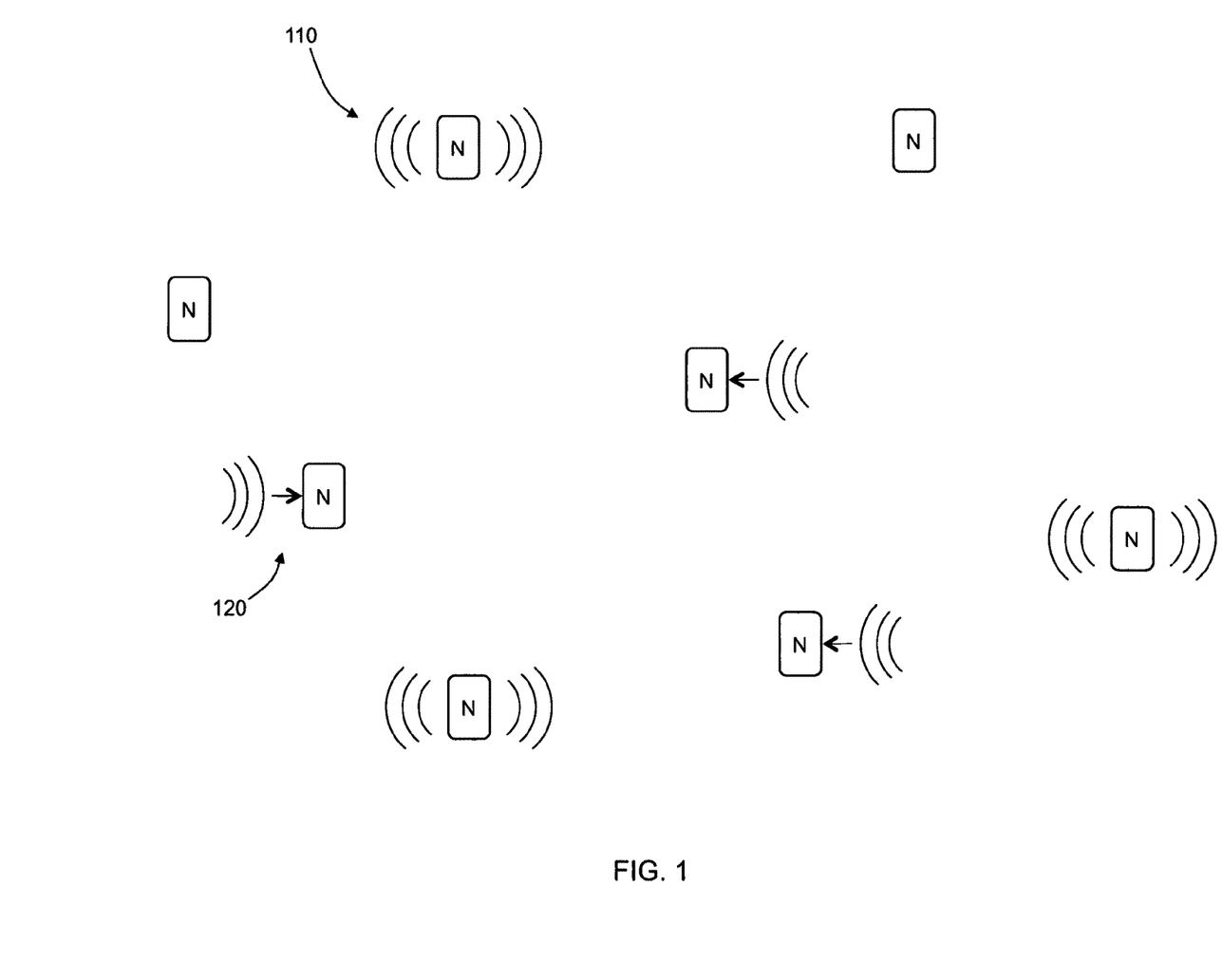
FIG. 1 shows an example of a plurality of wireless nodes communicatively connected through a broadcast-only network.

FIG. 1 shows an example of a distributed network of a plurality of wireless nodes N. The distributed network can include any number of nodes. Each of the nodes of the distributed network can broadcast 110 or receive 120 messages from its neighboring nodes. In a preferred embodiment, the nodes are wireless sensor and/or actuator nodes, or nodes without any sensor and/or actuator device. However, any device capable of bidirectional communication can be a node in the network. Though the present approach is suited for wireless networks, one or more wired nodes can also be members of the network.

Figure 2:
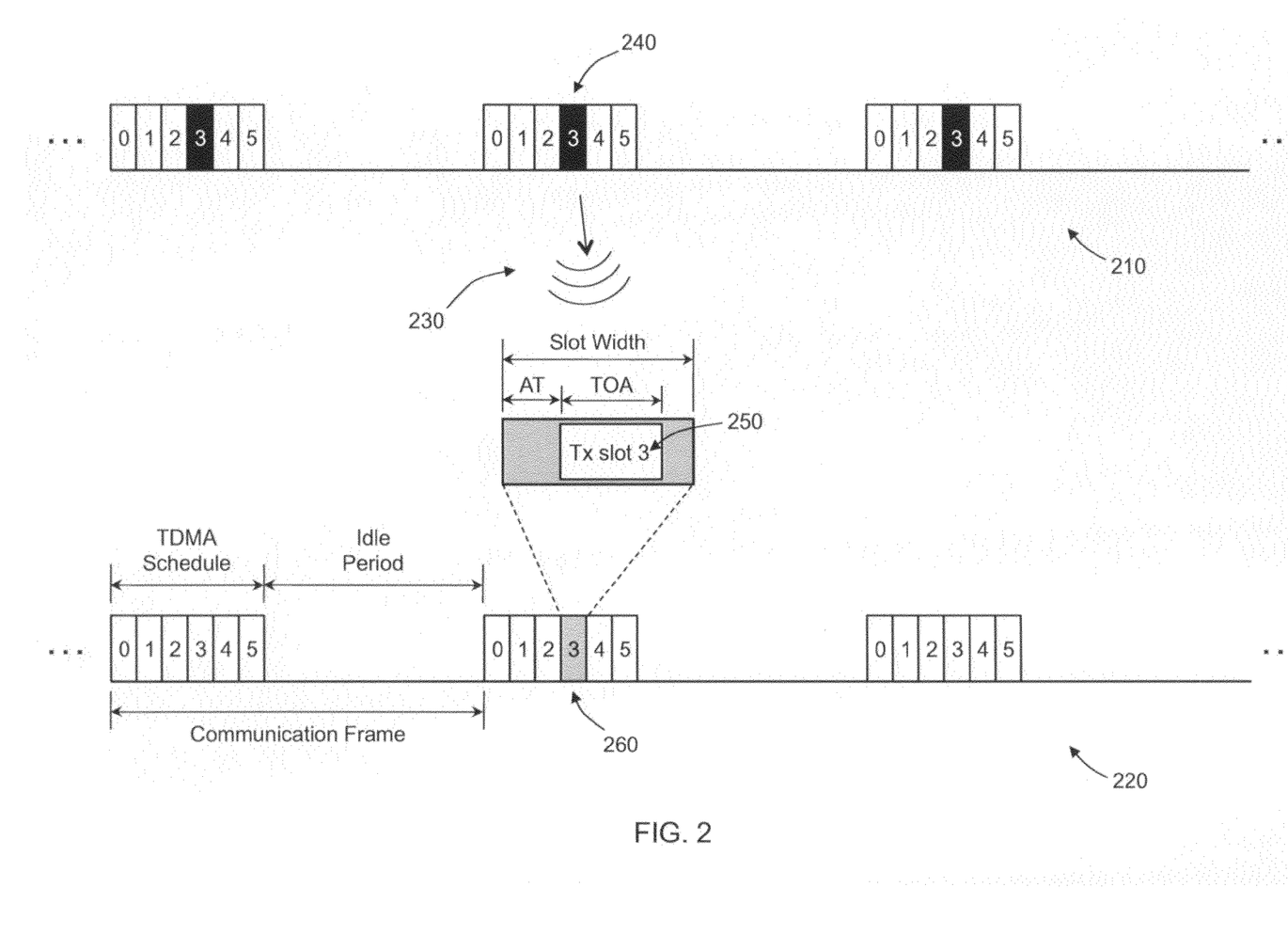
FIG. 2 shows an example of synchronized communication frames that include an active TDMA schedule with TDMA slots and an idle period.

At least some of the nodes are communicatively connected and communicate with the use of repeated communication frames. FIG. 2 shows a repeated communication frame of a broadcasting node 210 and a repeated communication frame of a listening node 220. Each communication frame includes an idle period and a time divisional multiple access (TDMA) schedule (i.e., an active period) for active communication. The TDMA schedule includes a plurality of TDMA slots. A broadcast function is provided for each of the nodes to use one or more of the TDMA slots to broadcast messages. A listen function is also provided for each of the nodes to listen for and receive a broadcasted message. One or more TDMA slots are used to listen for and receive the broadcasted messages. For example, FIG. 2 shows a node broadcasting 230 a message through a TDMA slot 240 and another node receiving the broadcasted message in slot 260. Preferably slot 240 and slot 260 have the same slot number. Preferably, each of the broadcasted messages includes an identifier 250 of the TDMA slot used to broadcast the message. The identifier 250 can be a part of the MAC header of the broadcasted message.

Slot usage information can also be a part of the MAC header of the broadcasted message. The slot usage information includes information that a listen slot has received a message, that no message has been received from a neighboring node, and/or if a collision has been detected. The slot usage information can be used to prevent the hidden terminal problem. In an embodiment, each node does not broadcast any messages during one frame and evaluates the slot usage information of its neighbors in the next frame. By repeating this process over a randomized interval of frames, preferably from about 15 to 20 frames, the hidden terminal problem can be avoided.

It is important to note that this distributed network does not require a central or beacon node coordinating the other nodes. Particularly, in a preferred embodiment, none of the nodes in the network coordinates the TDMA schedule and the TDMA slots of another node of the network. The distributed functions for the nodes include network synchronization, TDMA schedule length and position, TDMA slot allocation, collision avoidance, and hidden-terminal avoidance. The broadcast function allows a node to transmit a message by a broadcast-only mechanism, which does not require an address of another node. The neighboring nodes have control over what to do with the broadcasted message. In other words, a neighboring node can decide to receive and process the message, to receive and discard the message, or use a provided ignore function to not listen for any broadcasted messages.

In a preferred embodiment, some of the nodes, a majority of the nodes, or all of the nodes in the network are approximately synchronized. Synchronized nodes have communication frames with time overlapping TDMA schedules to allow communication between nodes. In other words, overlapping TDMA schedules enable a message broadcasted from a TDMA slot of one node to be received by a TDMA slot of another node.

With a broadcast-only distributed communication system, the nodes can be extremely energy efficient.

Moreover, by constraining the slot allocation of a TDMA schedule, the energy consumption is deterministic and therefore battery life and/or energy scavenging mechanisms become predictable. In addition, the distributed network of the present approach is also scalable, unlike existing centralized networks. Furthermore, in contrast to standard address-oriented message systems, the broadcast-only communication system of the present approach does not require CTS, RTS, or ACK messages or functions.

In an embodiment, the communication frame of each of the nodes has a fixed length. The fixed length of the communication frame ranges between about 0.5 seconds and about 5 seconds, and is preferably about 1 second. In an alternative embodiment, the communication frame of each of the nodes has a variable length. A node may vary its communication frame length based on energy consumption and data throughput requirements. Shorter communication frames generally increase energy consumption, while allowing for greater data throughput.

Figure 3A:
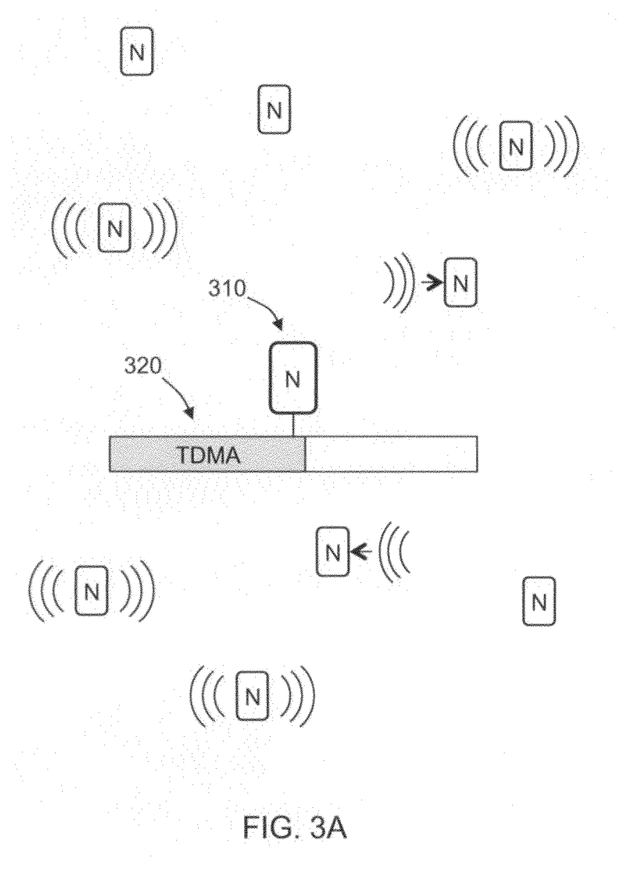
FIGS. 3A-3B show an example of a dynamic TDMA schedule length for a node based on the number of neighboring nodes.
Figure 3B:
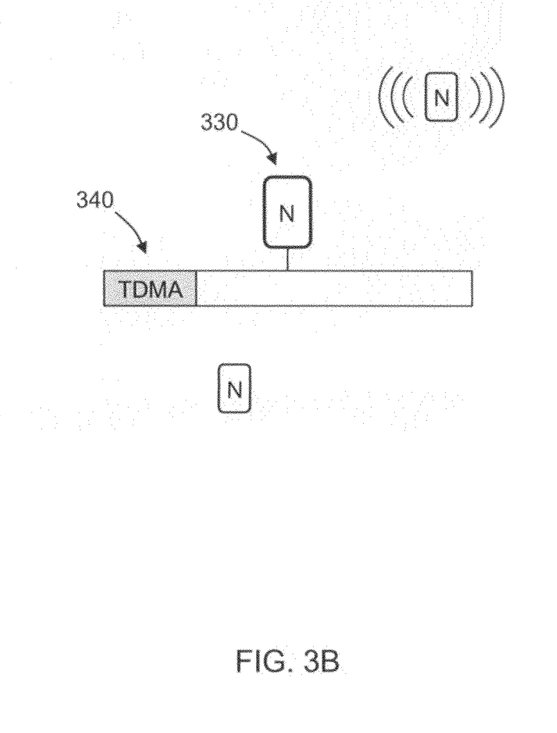

As mentioned above, each communication frame includes a TDMA schedule for active communication and an idle period, where little or no activity occurs. In an energy-efficient embodiment, the idle period is longer than the TDMA schedule. Preferably, the length of the TDMA schedule, defined by the number of TDMA slots, of a node can be changed. The change in length of the TDMA schedule can be based on the number of neighbors of the node. FIG. 3A shows an example of a node 310 with a large number of neighboring nodes. To avoid or minimize collisions, the node 310 increases its TDMA schedule 320 (i.e. increases the number of TDMA slots) to accommodate the large number of neighbors. FIG. 3B shows the opposite situation, in which a node 330 has only a small number of neighboring nodes, thus its TDMA schedule 340 is shorter than the TDMA schedule 320 of node 310.

In a preferred embodiment, each of the TDMA slots of the TDMA schedule is allocated to be a listen slot, a transmit slot, or an idle slot. Each of the nodes controls the allocation of its TDMA slots. When a TDMA slot is allocated for a specific function, the entire duration of the slot is dedicated for that same function. For example, in FIG. 2, the broadcasting node 210 has allocated TDMA slot 3 to be a transmit slot and the receiving node 220 has allocated TDMA slot 3 to be a listen slot. When two or more adjacent slots are allocated with the same function, a contiguous period occurs for that function. In a preferred embodiment, the allocation of TDMA slots is dynamic, where a node measures the usage of the TDMA slots by neighboring nodes and allocates the TDMA slots based on the measured usage of the TDMA slots, and/or the usage of the TDMA slots of the neighboring nodes, provided in the slot usage information provided in the header of each message.

It is important to note that the width of each of the TDMA slots is greater than a time-on-air TOA of each of the broadcasted messages. Having the TDMA slot width greater than the time-on-air allows the nodes to compensate for clock drifts between nodes and remain in communicative contact with other nodes. For each message received, an arrival time AT can also be measured upon reception of the message. The arrival time is the difference in time between the actual position of the received message and the beginning of the TDMA slot receiving the message.

In an embodiment, the time-on-air period is based on the data rate and the payload length. For example, data rates can range between about 250 kbps and about 2 Mbps, and payload lengths can range between about 32 bytes to 128 bytes. With these data rates and payload lengths, the time-on-air period ranges from about 300 µs to about 10 ms. In a preferred embodiment, the time-on-air period is about 300 µs and the TDMA slot width is about 800 µs.

Figure 4:
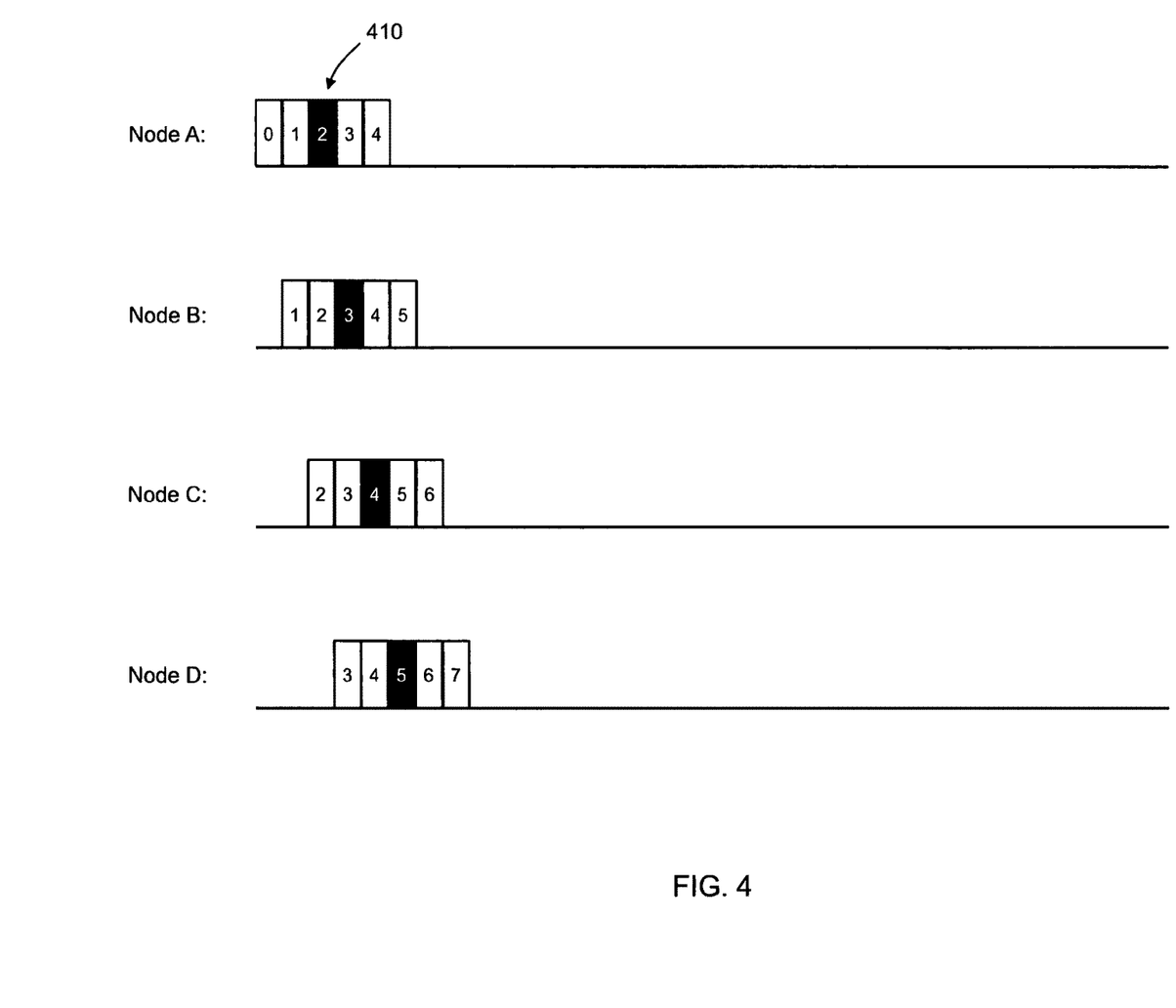
FIG. 4 shows an example of the communication frames of four nodes having swarm TDMA schedules.

In an embodiment, the TDMA schedule of each of the nodes can also be dynamic in position. FIG. 4 shows the communication frame for four nodes, A-D, capable of having a "swarm"-like behavior. The position of the TDMA schedules of each of the nodes is dependent on the positions of the TDMA of the neighboring nodes. In an exemplary embodiment, the TDMA schedule of each node has fixed number of slots with the middle slot 410 allocated to be a transmit slot. The transmitted messages can include slot usage information that the receiving nodes can use to adjust its TDMA schedule position. With the swarm-like TDMA schedules, as represented in FIG. 4, the nodes have symmetrical communication properties with its neighbors. The constant TDMA schedule length allows for a known energy consumption and predictable battery life of nodes.

Figure 5:
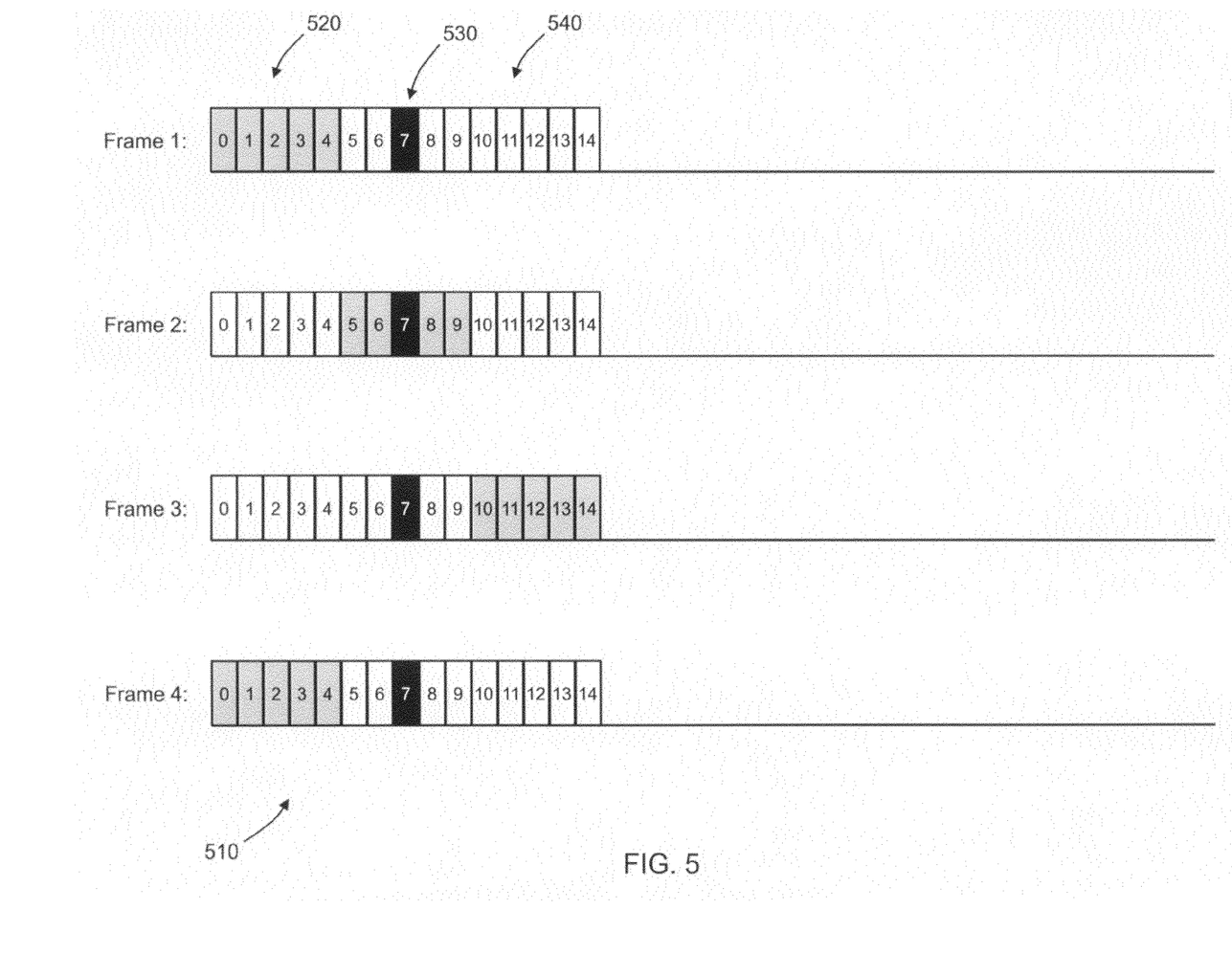
FIG. 5 shows an example of consecutive communication frames of a single node having a cluster TDMA schedule.

Embodiments can include dynamic allocation of the TDMA slots. FIG. 5 shows four consecutive communication frames of a single node having a cluster TDMA schedule 510. Under the cluster TDMA schedule scheme, the TDMA schedule length of a node is rounded to a multiple of a cluster length. Only one cluster is active per communication frame, as represented by the shaded TDMA slots 520 in FIG. 5. The TDMA slots of the active cluster can be allocated to be listen slots, whereas the TDMA slots not in the active cluster can be allocated to be idle slots 540. The node schedules the next cluster to be active in the next communication frame. In an embodiment, while the clusters are scheduled over the frame, the transmit TDMA slot 530 remains at the same position. Though the cluster length is shown to be 5 TDMA slots in FIG. 5, any cluster length can be employed. The use of a cluster TDMA schedule allows a node to receive messages from many neighbors, distributed over time using multiple frames. In addition, the energy consumption remains constant and is independent of the number of neighbors.

In another embodiment, communication between nodes in a crowded environment can rely on a constant length TDMA schedule with transmit slot skipping. The TDMA schedule length can be determined based on available energy and required data throughput with the neighboring nodes. The transmit TDMA slot allocation can be based on slot usage information of the node itself and/or the slot usage information of the neighboring nodes. Transmit slot skipping is activated when there are more neighbors than available TDMA slots in the TDMA schedule. In such a circumstance, a node will decide to skip a transmission in one or more frames. The transmit TDMA slot is temporarily allocated to be a listen slot to receive messages from the neighbors using the same slot during the one or more frames. With transmit slot skipping, the node is capable of communicating with other nodes in a crowded environment without having to add TDMA slots, thereby maintaining low energy consumption.

Communication between nodes in the distributed network requires the communication frames of the nodes to be approximately synchronized. More generally, communication is possible when the TDMA schedules of communicating nodes at least partially overlap. Node synchronization exists when the communication frames of communicating nodes start at approximately the same time. Synchronization is difficult to maintain due to clock drift. In an embodiment, each node can occasionally or periodically update its communication frame start time to stay approximately synchronized with the rest of the network. It is important to note that this update does not require communications with a central time-keeping node.

Figure 6:
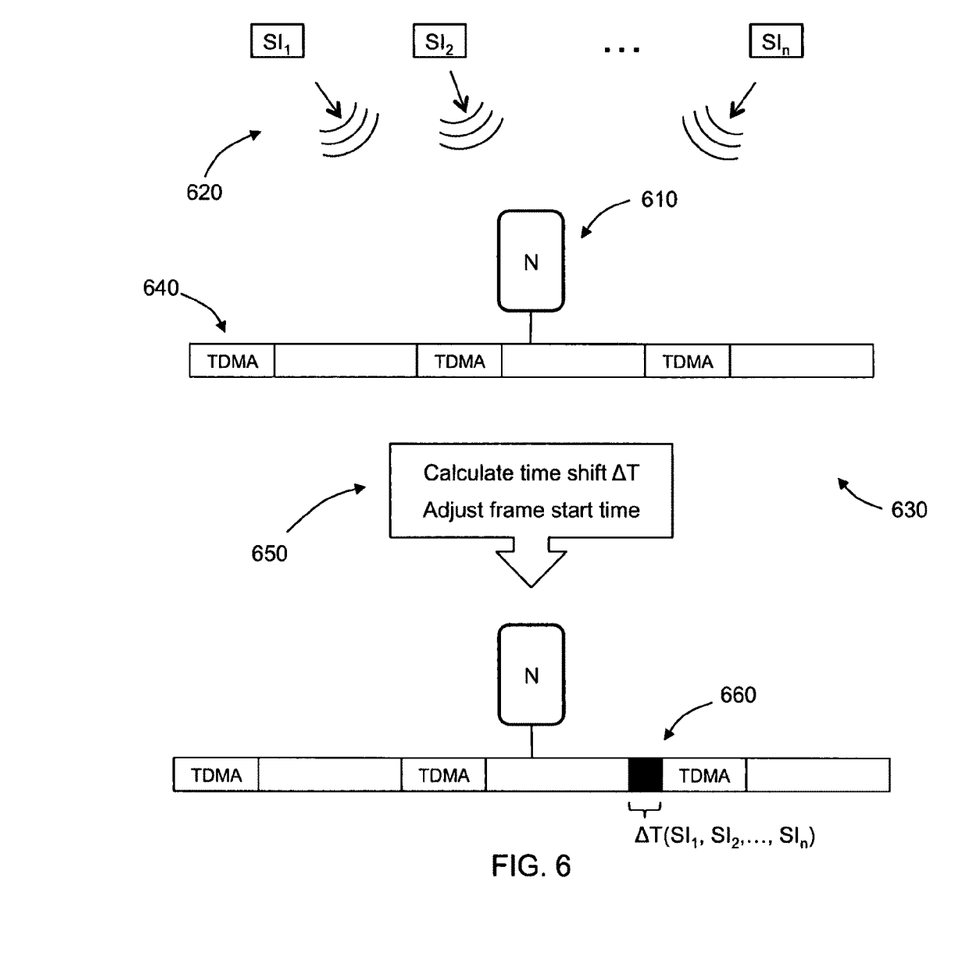
FIG. 6 shows an example of determining the start time of a communication frame of a node based on received messages.

FIG. 6 shows a node 610 determining the start time for its repeated communication frame 630 and the TDMA schedule 640. Node 610 receives one or more broadcasted messages 620 from its neighbors. The broadcasted messages 620 include slot identifiers $SI_1$-$SI_n$, for identifying the TDMA slots used to transmit the broadcasted messages 620. A time shift $\Delta T$ is calculated 650 based at least partially on the received slot identifiers $SI_1$-$SI_n$. The time shift $\Delta T$ is used to determine and adjust the start time 660 of the communication frame 630. The adjustments to the communication frame start time 660 help to prevent the loss of synchronization of a node with the rest of the network due to drift in the node's internal clock. In another embodiment, a node measures the arrival times of the received messages in addition to the slot identifiers $SI_1$-$SI_n$, and calculates the time shift $\Delta T$ based on the arrivals times and the slot identifiers $SI_1$-$SI_n$.

The time shift calculation can involve any calculus that mitigates the effects of clock drift. Example time shift calculations include taking the average or median of the slot identifiers and/or arrival times. In an embodiment, the time shift uses the following calculation: $\Delta T = G * \text{median}[\delta T(Rx_1), \delta T(Rx_2), \ldots, \delta T(Rx_n)]$, where G is a gain factor and $\delta T(Rx_i)$ is the difference between the expected arrival time and the actual arrival time of the $i^{th}$ received message. The gain factor G preferably ranges between 0.5 and 1, and is typically 0.75.

Though FIG. 6 shows an adjustment of the communication frame start time based on received messages, there are circumstances when a node cannot communicate with any of the other nodes in the network, i.e. the active TDMA schedule of the node does not overlap with the TDMA schedule of any of the neighboring nodes. For example, loss of synchronization can arise when a node is isolated from the rest of the network for a sufficiently long time for its TDMA schedule to drift away. When the isolated node attempts to rejoin the network and communicate with the other nodes, it fails due to the non-overlapping TDMA schedules.

Figure 7:
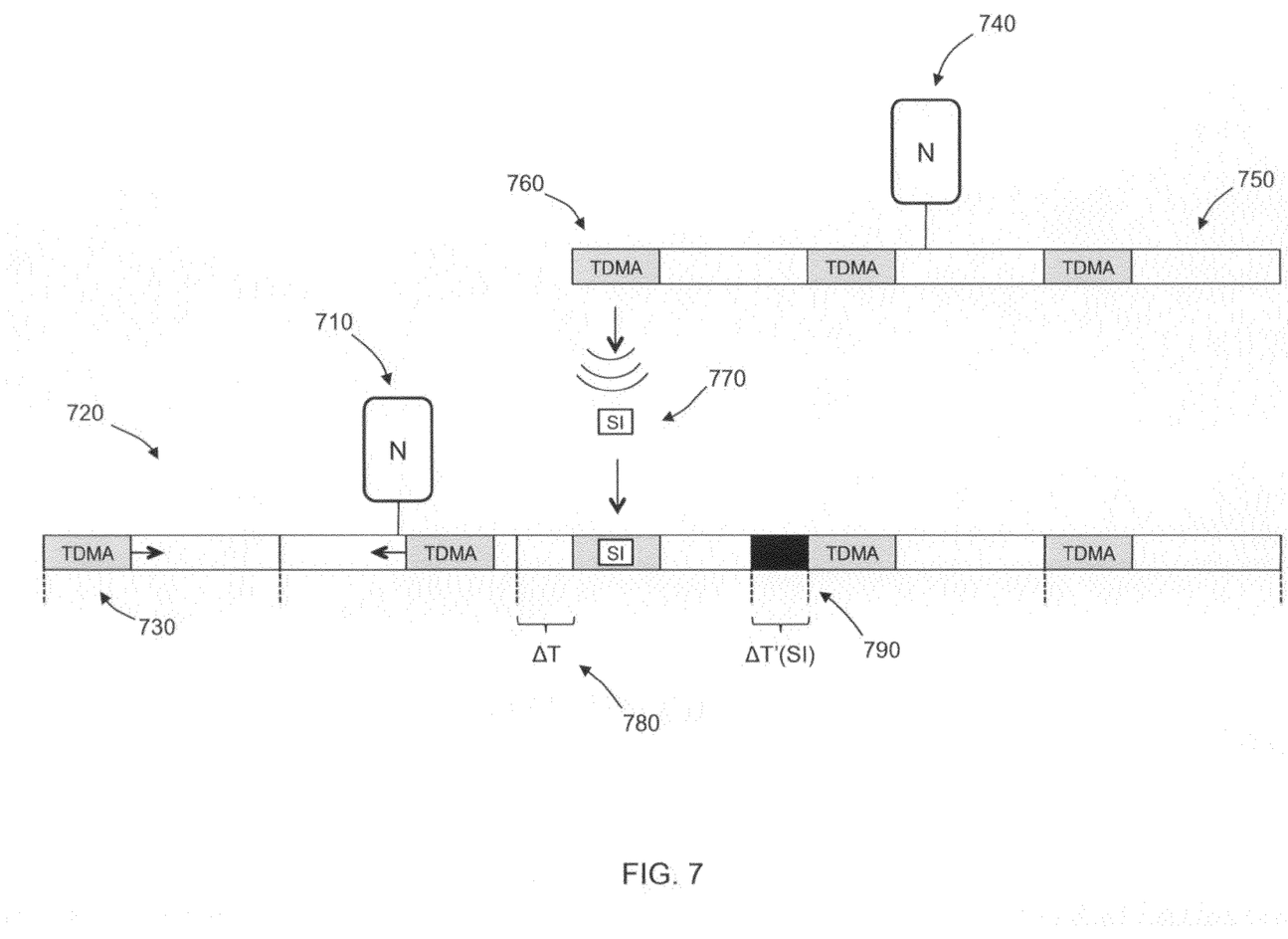
FIG. 7 shows an example of a search function allowing a node to change a property of its communication frame to search for another node.

FIG. 7 shows an example search function for a node 710 to find one or more other nodes in the network. The node 710 activates the search function only if it has not received any broadcasted messages during a number of consecutive communication frames 720. In an embodiment, the number of consecutive communication frames to activate the search function is about 30. When the communication frame length is one second, this corresponds to half a minute of having no communication before a nodes enters the search mode. When activated, the search function allows the node to change one or more properties of its communication frame, including the start time of the communication frame, the length of the communication frame, the position of said TDMA schedule in the communication frame, the length of the TDMA schedule, the position of the idle period in the communication frame, the length of the idle period, or any combination thereof.

In FIG. 7, node 710 is in search mode and moves the position of its TDMA schedule 730 until the TDMA schedule 730 overlaps with a TDMA schedule 760 of a neighboring node 740. Enabled by the overlap in the TDMA schedules, node 710 can potentially receive a message 770 broadcasted by the neighboring node 740. The broadcasted message 770 can include the slot identifier SI and/or a measured arrival time. The received message along with the known moved position ΔT of the TDMA schedule 730 during searching can be used to synchronize node 710 with node 740. Once in communication with another node, the search function is deactivated.

In another embodiment, a node operating the search function performs the following steps: (1) Increase the communication frame length from T(idle)+T(TDMA) to T(idle)+2*T(TDMA), where T(idle) is the length of the idle period and T(TDMA) is the length of the TDMA schedule. (2) Search with the communication frame length of step (1) for [T(idle)+T(TDMA)]/T(TDMA)+1 cycles. (3) Decrease the communication frame length to T(idle) for the same number of cycles as in step (2). The node will repeat steps (1)-(3) until it receives a message from a neighboring node. After the message is received, the searching node approximately synchronizes with the node that broadcasted the received message. The communication frame length is reset back to T(idle)+T(TDMA) after the search is successful.

Figure 8:
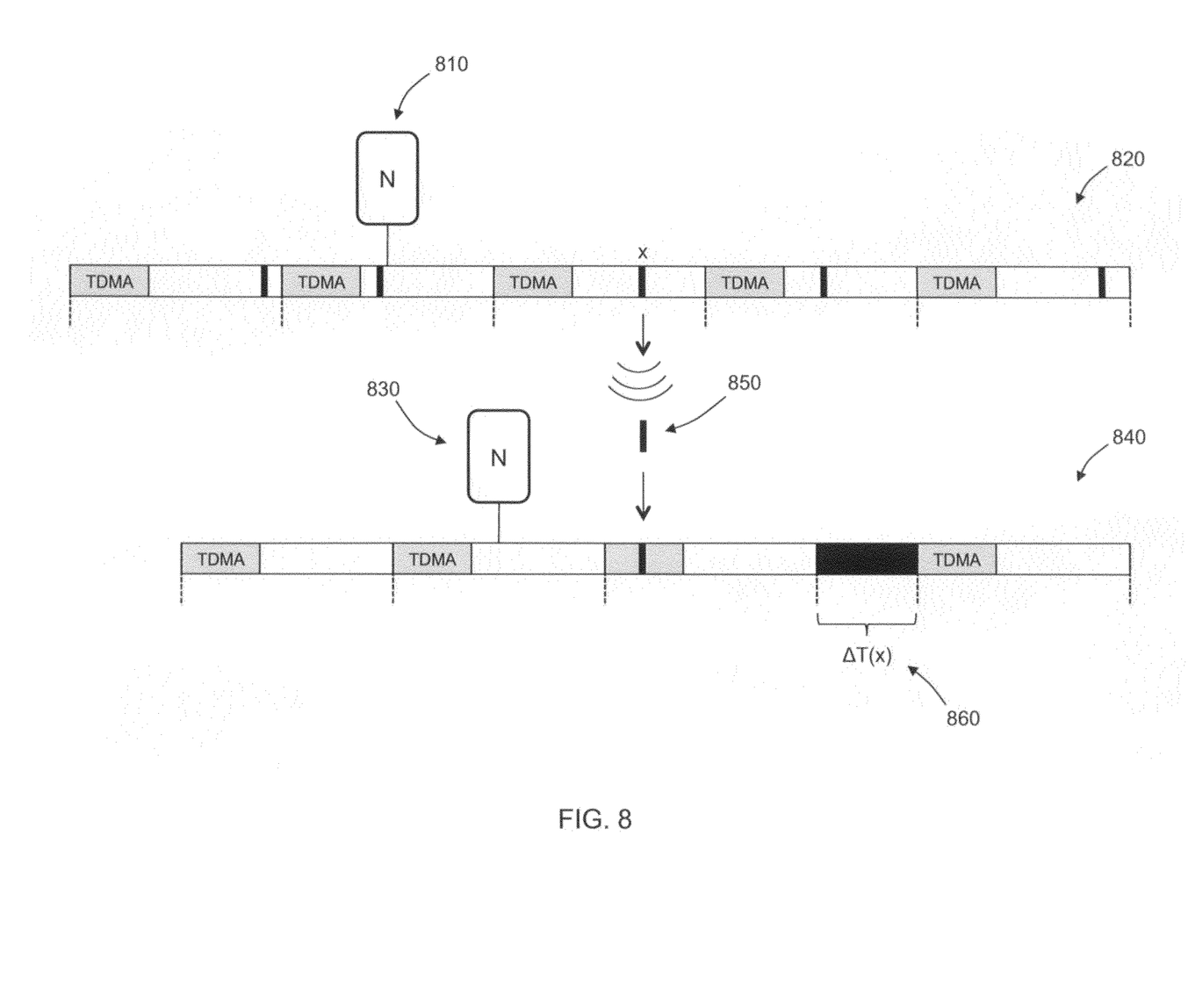
FIG. 8 shows an example of a join function allowing a node to broadcast a join message from a random position.

In a preferred embodiment, a join function is provided to the nodes of the distributed network for synchronization of nodes. FIG. 8 shows an example of the join function for synchronizing the communication frame 840 of node 830 to the communication frame 820 of node 810. When operating the join function, node 810 transmits a join message from a random position in the idle period of each communication frame 820. By a stochastic process, one of the join messages 850 transmitted from a random position x will overlap with a TDMA schedule of the communication frame 840 of another node 830. The join message 850 includes the random position x. In an embodiment, the join message 850 does not include any other information other than the random position x. Upon reception of the join message 850, node 830 can shift its TDMA schedule by a time shift ΔT(x) to approximately synchronize node 830 to node 810. The time shift ΔT(x) is at least partially based on the random position x.

In a preferred embodiment, each node transmits a join message during every communication frame. Since the join message is transmitted from the idle period, when nodes are in synchronization, the join messages have no effect. Preferably, nodes with activated search functions do not transmit join messages.

The join function, as described above, allows for an energy efficient and scalable process for node synchronization. The join function can be used in circumstances in which the search function is not applicable. For example, when a plurality of nodes is subdivided into two or more groups with intra-group synchronized members, the search function will not be activated because there is no reason to begin searching when the members are already intra-group synchronized. Without operating the join function, inter-group communication is not possible and the groups will remain isolated from one another. When the join function is utilized, the multiple groups will eventually merge into one or a small number of groups. This merging of groups is accomplished in an undirected manner. In practice, a smaller group will likely synchronize to a larger group simply because the larger group has more join messages to broadcast than the smaller group.

Section B: Network Time Synchronization

Figure 9A:
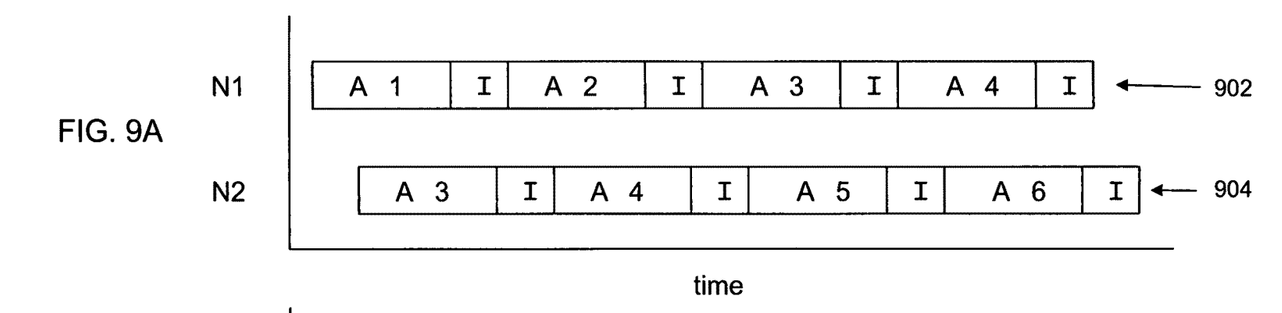
FIGS. 9A-9C show an example of network time synchronization according to an embodiment of the invention.
Figure 9B:
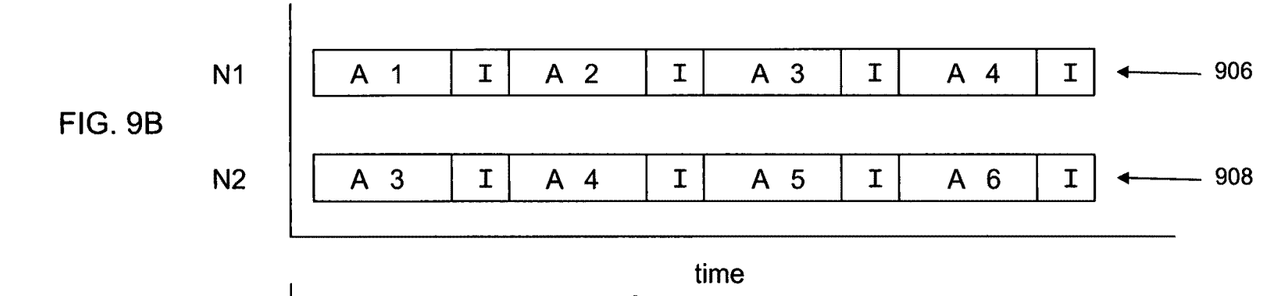
Figure 9C:
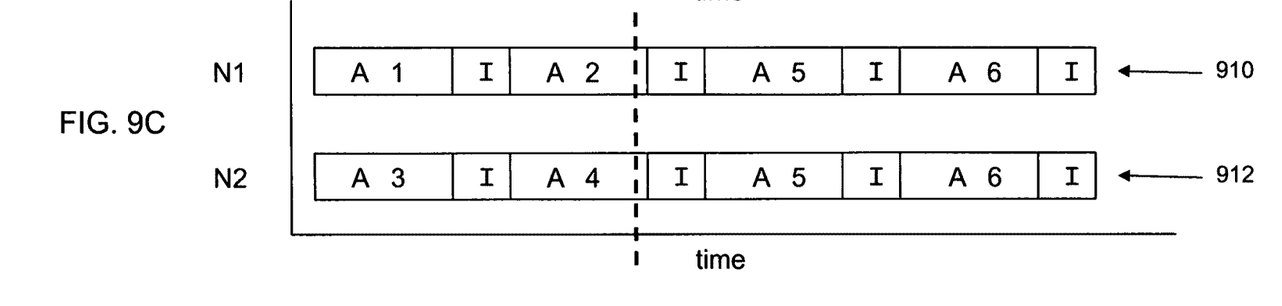

FIGS. 9A-9C show an example of how network time synchronization can be provided in connection with broadcast-only networks having frame synchronization as described above.

FIG. 9A schematically shows states of two nodes as a function of time. More specifically, state 902 pertains to a first node N1 and state 904 pertains to a second node N2. The idle periods of each node's communication frames are labeled with "I", while the active periods are each labeled with "A". In addition, each active period is labeled with a number, which is that node's network time. As indicated above, each node increments its version of the network time during each idle period. For simplicity in these examples, this increment is one unit. The scenario shown on FIG. 9A relates to a situation where there is no synchronization between nodes N1 and N2. For example, N2 could have just joined the network.

By synchronizing the frames of these two nodes, the situation shown in FIG. 9B will result. Here, it is apparent that the active period start and end times are approximately aligned for nodes N1 and N2, which is not the case on FIG. 9A. Frame synchronization is described above, e.g., in connection with FIG. 6.

FIG. 9C shows an example of network time synchronization. In this example, it is assumed that node N1 receives a time-stamped broadcast message from node N2 near the end of its active period A2 (indicated by a vertical dashed line on FIG. 9C). By operation of the above described algorithm, the network time of node N1 will be changed from 2 to 4 on receipt of this message, because the received time value (i.e., 4) is greater than the current local value (i.e., 2). After this point, the network times of both nodes remain synchronized, and continue to be incremented during each idle period.

This network time can be regarded as being an example of a shared network state. Using this shared state environment, a large group of nodes can be time synchronized in a global sense (i.e., over the whole network). This global synchronization of network time relies on and complements the relative synchronization of the communication frames. The global time synchronization principle takes care of the global network time, which acts as the global "wall-clock" for all nodes in the network. During idle periods of the communication frames, every node can increment the local time. Between time ticks (i.e., during active periods of communication frames) a node transmits its local time to its peers. For example, when a node transmits a message the local time value can be incorporated in the message and if a node receives a message it can be assumed that the local time of the sender is included. The network synchronizes global time based on the algorithm on each node that the local time becomes the highest time value of either the local time or the received time.

More specifically, a receiving node compares the received time value with its own time value. If the received time value is greater than a node's own time value then the node's own time value becomes the received time value. This equalizes the time values between the sending and receiving nodes. Both of the nodes will increment their local times before transmitting in the next active time slot, so they stay synchronized. This synchronization of network time values local to each node will propagate and distribute to other nodes of the network.

In this way the local time values at each node become the shared global time value. Based on this algorithm there is no need for a central master clock. The network synchronizes itself in an global way by broadcast of time-stamped messages.

As one of ordinary skill in the art will appreciate, various changes, substitutions, and alterations could be made or otherwise implemented without departing from the above-described principles, e.g. other wired and/or wireless devices can be members of the network, including data storage devices. Accordingly, the scope of the invention should be determined by the following claims and their legal equivalents.

The invention claimed is:

1. A method for distributed wireless communication, the method comprising:
   providing a plurality of nodes;
   partitioning periodically repeated communication frames of each of said nodes into first periods which are active periods and second periods in which no transmission or reception occurs;
   broadcasting one or more messages from one or more of said nodes during said active periods to provide broadcasted messages;
   including active period start time information of broadcasting nodes in one or more of said broadcasted messages to provide frame-stamped messages;
   listening for one or more of said broadcasted messages at one or more of said nodes during said active periods;
   synchronizing said active periods of said repeated communication frames of said nodes by adjusting start times of said repeated communication frames of one or more of said nodes receiving said frame-stamped messages;
   maintaining a network time at each of said nodes, wherein said network time is incremented at each of said nodes by a predetermined amount during each second period of said repeated communication frames;
   including network times of broadcasting nodes in one or more of said broadcasted messages to provide time-stamped messages;
   synchronizing said network times of said nodes by setting network times at one or more of said nodes receiving said time-stamped messages to the larger of a local node network time and a network time in a received time-stamped message;
   wherein said adjusting start times of said repeated communication frames comprises determining a time offset between a local frame start time and a frame start time of a received frame-stamped message, and updating said local frame start time to reduce or eliminate said time offset.

2. The method of claim 1, wherein said network time is a digital value that is an integral multiple of a unit duration, and wherein said predetermined amount is the unit duration.

3. The method of claim 1, wherein the communication frames have a repetition rate, and wherein each of said nodes has the repetition rate.

4. The method of claim 1, wherein a duration of said repeated communication frames is fixed in time.

* * * * *